(12) United States Patent
Bansal et al.

(10) Patent No.: US 6,968,323 B1
(45) Date of Patent: Nov. 22, 2005

(54) DYNAMIC ALLOCATION AND PRICING OF RESOURCES OF WEB SERVER FARM

(75) Inventors: Vipul Bansal, New Delhi (IN); Rahul Garg, Ghaziabad (IN); Aditya Afzulpurkar, Karnataka (IN); Samrat Sen, West Bengal (IN)

(73) Assignee: International Business Machines Corporation, Armonk, NY (US)

( * ) Notice: Subject to any disclaimer, the term of this patent is extended or adjusted under 35 U.S.C. 154(b) by 660 days.

(21) Appl. No.: 09/680,017

(22) Filed: Oct. 5, 2000

(51) Int. Cl.$^7$ ............................................. G06F 17/60
(52) U.S. Cl. ................ 705/80; 705/7; 705/8; 705/9; 705/26; 705/400; 709/224; 709/225; 709/229; 370/230; 370/231; 370/232; 707/10; 379/309
(58) Field of Search .................... 705/80, 64, 7–9, 705/26, 400; 709/224, 225, 229; 370/230–232; 707/10; 379/309

(56) References Cited

U.S. PATENT DOCUMENTS

| | | | |
|---|---|---|---|
| 5,640,569 A * | 6/1997 | Miller et al. ................. | 710/241 |
| 5,828,737 A | 10/1998 | Sawyer | |
| 5,867,494 A * | 2/1999 | Krishnaswamy et al. ... | 370/352 |
| 5,873,071 A * | 2/1999 | Ferstenberg et al. ........... | 705/37 |
| 6,021,398 A | 2/2000 | Ausubel | |
| 6,026,383 A | 2/2000 | Ausubel | |
| 6,035,288 A | 3/2000 | Solomon | |
| 6,055,504 A | 4/2000 | Chou et al. | |
| 6,066,504 A | 5/2000 | Jina | |
| 2002/0082856 A1 * | 6/2002 | Gray et al. ..................... | 705/1 |

FOREIGN PATENT DOCUMENTS

JP  2000-250801  * 9/2000  ........... G06F 12/00

OTHER PUBLICATIONS

Essex, David. "Living with Windows 2000" (Computerworld v35n32 PP: 46 Aug. 6, 2001). Retrived from DIALOG May 5, 2005.*

* cited by examiner

Primary Examiner—James A Reagan
(74) Attorney, Agent, or Firm—McGinn & Gibb, PLLC; T. Rao Coca, Esq.

(57) ABSTRACT

The present invention relates to a computer implementable system and method for allocation and pricing of classified resources of a web server farm to customers by a resource center comprising means for providing different levels of service by dynamically allocating and pricing said resources based on customers' changing needs, and their willingness to pay.

15 Claims, 8 Drawing Sheets

Communication Network

DYNAMIC ALLOCATION AND PRICING OF RESOURCES OF WEB SERVER FARM

FIELD OF THE INVENTION

The present invention relates generally to online negotiations and more specifically to dynamic allocation and pricing of resources of web server farm to customers.

BACKGROUND OF THE INVENTION

The idea of having a resource center, which provides computational resources over a communication network, is not new. It has been used in many universities to provide computing resources to various departments/students/faculty etc. from a centralized computer center which houses computers and software applications of various kinds that can be shared by multiple users belonging to the organization. In such a scenario, typically, the allocation of resources is done by a central authority in the organization by controlling access i.e. deciding who can have access to which resource. Pricing of individual users or departments is often avoided (since they belong to the same organization who pays for the resources), or a charge based on number of users using each type of resource is applied to the respective departments/users. In some cases, the charges may even be based on the actual use by different users of the different resources calculated on a post-facto basis.

With the spread of the Internet to homes and businesses, the above model has evolved to provide shared computation and communication resources to multiple users over the Internet. A typical web site embodies this model of resource sharing in the sense that the multiple users accessing the web site make use of the shared resources. Web server's computational resources, associated storage, bandwidth of the communication link which connects the web site to the Internet and the software applications running on the web site, are some examples of such resources. In this model, the organization owning the web site typically pays for these resources. It may or may not charge the internet users for accessing the web site. The demand for various resources mentioned above (for a web site) changes with time due to the fluctuation in the number of users accessing the web site and the applications that they may use from time to time. In the above model of web site hosting, the resources have to be adequate to take care of the peak demand otherwise some users will not be able to access the site when the demand is high. This results in under-utilization of the resources on an average, and hence higher costs for running the web sites. The resource utilization can be improved if multiple web sites share their computation and communication resources, so that at a time when a particular web site does not require too many resources, the same can be used to service the needs of some other web site, which needs those resources at that point of time.

Besides the hosting of popular Internet web sites, there is another domain, which has similar needs. Businesses, especially the small and medium-sized ones which cannot afford large enterprise-wide systems, are finding it advantageous to outsource their entire IT requirements to service companies that host, manage, and maintain business applications on their infrastructure (called web server farms). These applications can be delivered to the businesses over a private network or the Internet. These service companies are commonly known as Application Service Providers (ASPs). Instead of making a huge investment in infrastructure resources to provide for the peak load of each of their customers' sites individually, an ASP would find it advantageous to host the sites of multiple customers on a common infrastructure, wherein the resources can be shared between the customers.

The challenge has thrown up opportunities for companies to set up web server farms, which can host the applications of multiple customers, i.e. multiple ASPs or multiple web sites or a combination of both. The web server farm provides the computational and communication resources for hosting and delivering the customers' applications.

At present, the allocation of resources is static (decided upfront) and the services are charged on a monthly/yearly flat rate basis. This is not an efficient model because (a) If the resources are pooled for all customers, then the customers who use the resources less end up subsidizing those who use them more, (b) If the resources are partitioned between the customers, then the potential gains from sharing are lost, and (c) Moreover the web server farm cannot improve services for a particular customer during heavy traffic conditions by dynamically acquiring more resources to service that traffic, even if the customer is willing to pay for additional resources.

An important issue which surfaces when multiple customers (or web sites) are run out of a common infrastructure using resource sharing principles, is that of the ability to support different service levels for different customers. The existing pricing and allocation models used by the web server farms, which also employ some form of resource sharing, have the shortcoming that there is no economic mechanism to provide for different levels of service for different customers, based on their willingness to pay. Typically all the customers which use a set of shared resources get the same service level. Currently, the choice of service levels that customers can get is limited to hosting on a shared server, or dedicating a fixed number of servers to serve the web requests. Also, it is not possible to enhance the service levels of some customers dynamically, by allocating them more resources, based on their increased willingness to pay more for a better service for certain time periods.

A major gap in the existing knowledge has thus been on the issue of how to dynamically allocate shared resources and charge the individual web sites/customer sites when multiple customers (or web sites) are hosted out of the same infrastructure. Thus, while the prior art establishes that it is advantageous to share resources between the multiple customers (or web sites) as opposed to provisioning for each one's peak requirements, the prior art does not provide a good mechanism by which these shared resources can be dynamically allocated using economic prices.

THE OBJECTS AND SUMMARY OF THE INVENTION

The object of the present invention is to obviate the above drawbacks by developing a system, method and computer program product whereby software agents of the customers can negotiate with a software agent of the resource center for acquiring and releasing resources dynamically at economic prices.

To achieve the said objective the present invention provides a computer implementable system for allocation and pricing of classified resources of a web server farm to customers by a resource center comprising means for providing different levels of service by dynamically allocating and pricing said resources based on customers' changing needs, and their willingness to pay.

The said means for dynamically allocating and pricing resources is through mutual negotiations between said customers and said resource center either through electronic communication means or otherwise.

The above means further comprises:
mechanism for conducting an online auction of said resources by the resource center in case of non-availability of adequate idle resources to meet a customer request followed by re-allocation of said resources to said customers, updating of billing information and pricing based on the results of the auction of resources.
mechanism for conducting an online auction of resources at pre-specified intervals of time followed by re-allocation of said resources to said customers, updating of billing information and pricing based on results of the auction of resources.
mechanism for publishing the current prices for each class of resources at any point of time and means for updating the current prices dynamically based on requests for release or acquisition of resources by customers, followed by updating of billing information.

the arrangement being such that said mechanisms operate either individually or together in any combination of at least two mechanisms depending upon the requirement.

The said mutual online negotiations can take place between software-based agents representing said customers and said resource center.

The above system further includes:
means enabling the customers to provide price and service level related inputs to their respective software-based agents,
means for said software-based agents representing customers to monitor the usage of resources allocated to them and the levels of service being obtained, and
means for said software-based agents representing customers to use said inputs from said customers and said usage and/or said levels of service being obtained to dynamically determine when to request the software agent representing the resource center for acquiring or releasing resources at various prices.

The said current prices comprise the current price at which resources are allocated to customers, the new price that would prevail if specified units of resources are released by customers and the new price that would prevail if specified units of resources are acquired by the customers.

Each class of resources has some units dedicated to specific customers and the remaining units can be dynamically allocated to customers by the resource center.

The said resources in a resource center includes servers, storage media, software applications and bandwidth of communication link connecting said servers center to a network.

The present invention further provides a method for allocating and pricing classified resources of a web server farm to customers by a resource center comprising providing different levels of service by dynamically allocating and pricing said resources based on said customers' changing needs, and their wilingness to pay.

The said dynamic allocation and pricing of resources is through mutual negotiations between said customers and said resource center either through electronic communication means or otherwise.

The above method further comprises:
conducting an online auction of said resources by the resource center in case of non-availability of adequate idle resources to meet a customer request followed by re-allocation of said resources to said customers, updating of billing information and pricing based on the results of the auction of resources,
conducting an online auction of resources at pre-specified intervals of time followed by re-allocation of said resources to said customers, updating of billing information and pricing based on results of the auction of resources, and
publishing the current prices for each class of resources at any point of time and means for updating the current prices dynamically based on requests for release or acquisition of resources by customers, followed by updating of billing information.

the arrangement being such that said steps operate either individually or together in any combination of at least two steps depending upon the requirement.

The said mutual online negotiations can take place between software-based agents representing said customers and said resource center.

The above method further includes:
enabling the customers to provide price and service level related inputs to their respective software-based agents,
enabling said software-based agents representing customers to monitor the usage of resources allocated to them and the levels of service being obtained, and
enabling said software-based agents representing customers to use said inputs from said customers and said usage and/or said levels of service being obtained to dynamically determine when to request the software agent representing the resource center for acquiring or releasing resources at various prices.

The said current prices comprise the current price at which resources are allocated to customers, the new price that would prevail if specified units of resources are released by customers and the new price that would prevail if specified units of resources are acquired by the customers.

Each class of resources has some units dedicated to specific customers and the remaining units can be dynamically allocated to customers by the resource center.

The said resources in a resource center includes servers, storage media, software applications and bandwidth of communication link connecting said servers center to a network.

The instant invention further provides a computer program product comprising computer readable program code stored on computer readable storage medium embodied therein for enabling allocation and pricing of classified resources of a web server farm to customers by a resource center characterized in that, it includes a computer readable program code means configured for providing different levels of service by dynamically allocating and pricing said resources based on customers' changing needs, and their willingness to pay.

The said computer readable program code means configured for dynamically allocating and pricing resources is through mutual negotiations between said customers and said resource center either through electronic communication means or otherwise.

The above computer program product further comprises:
computer readable program code means configured for conducting an online auction of said resources by the resource center in case of non-availability of adequate idle resources to meet a customer request followed by re-allocation of said resources to said customers, updating of billing information and pricing based on the results of the auction of resources.
computer readable program code means configured for conducting an online auction of resources at pre-specified intervals of time followed by re-allocation of said resources to said customers, updating of billing information and pricing based on results of the auction of resources.

computer readable program code means configured for publishing the current prices for each class of resources at any point of time and means for updating the current prices dynamically based on requests for release or acquisition of resources by customers, followed by updating of billing information.

the arrangement being such that said computer readable program code means operate either individually or together in any combination of at least two computer readable program code means depending upon the requirement.

The said mutual online negotiations can take place between software-based agents representing said customers and said resource center.

The above computer program product further includes:

computer readable program code means configured for enabling the customers to provide price and service level related inputs to their respective software-based agents, computer readable program code means configured for said software-based agents representing customers to monitor the usage of resources allocated to them and the levels of service being obtained, and computer readable program code means configured for said software-based agents representing customers to use said inputs from said customers and said usage and/or said levels of service being obtained to dynamically determine when to request the software agent representing the resource center for acquiring or releasing resources at various prices.

The said current prices comprise the current price at which resources are allocated to customers, the new price that would prevail if specified units of resources are released by customers and the new price that would prevail if specified units of resources are acquired by the customers.

Each class of resources has some units dedicated to specific customers and the remaining units can be dynamically allocated to customers by the resource center.

The said resources in a resource center includes servers, storage media, software applications and bandwidth of communication link connecting said servers center to a network.

BRIEF DESCRIPTION OF THE DRAWINGS

The invention will now be described with reference to the accompanying drawings.

DETAILED DESCRIPTION OF THE DRAWINGS

Figure 1:
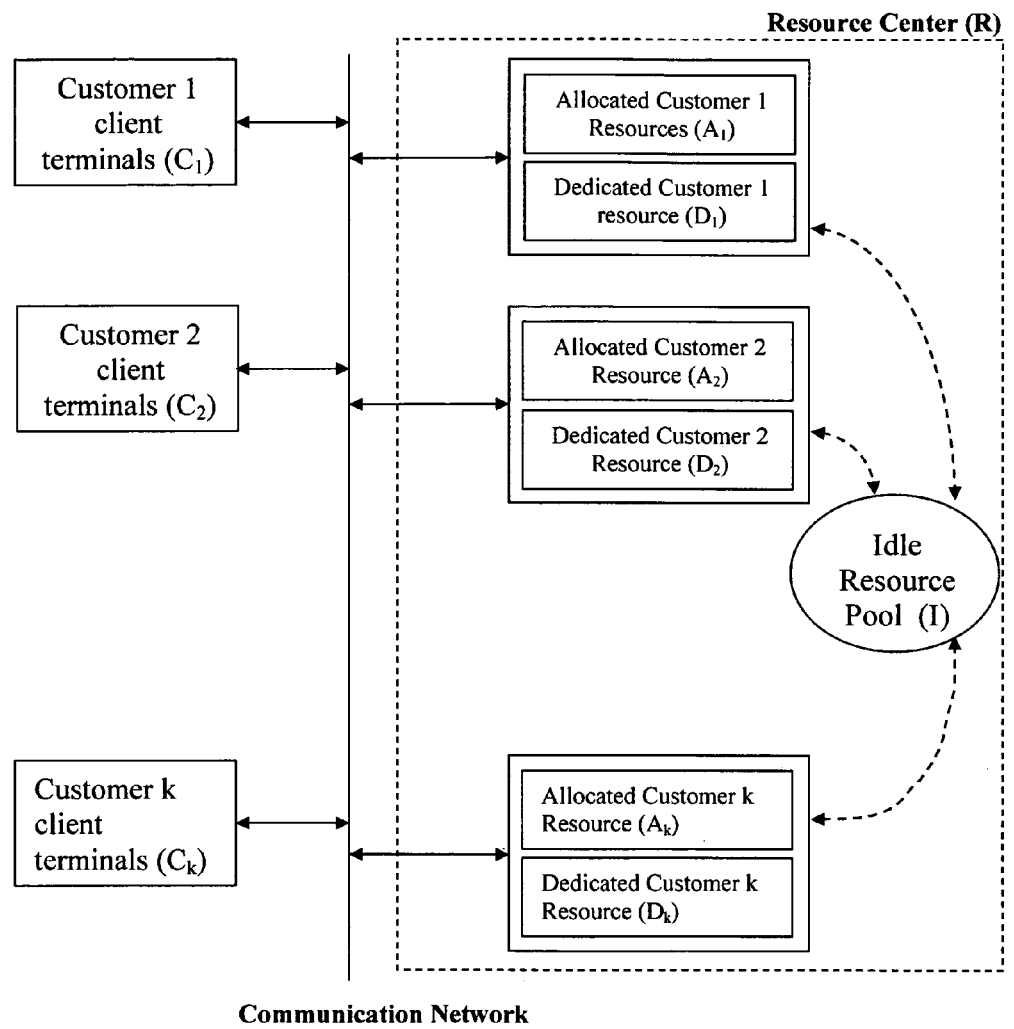
FIG. 1 shows the overall system setup and its various entities, according to this invention.

The invention relates to the scenario where customers have their applications (or web site content) hosted by a resource center and the customers' clients access these applications (or web site content) over a communication network. FIG. 1 shows the various entities in the system as explained below:

Resource Center (R): The term Resource Center is used here as a generic name for a web server farm and other similar entities. It contains multiple classes of computational and communication resources. Examples of resource classes may be servers (high performance computers), storage (disks, tapes etc.), bandwidth of link connecting the web server farm to the Internet, amongst others. The amount of resources in each class can be measured in terms of 'units' of resources. (For example, a unit of server resource can be one, or a certain fraction, or multiples of servers, a unit for bandwidth may be one kilo-bit-per-second (kbps), and so on). These resources are distributed as:

Dedicated Customer Resources ($D_1$ to $D_k$)

These resources are permanently assigned to specific customers and are designated as dedicated customer resources for the respective customers. Each customer can obtain on rent some units of dedicated resources according to its requirements. The pricing for dedicated resources may typically be a flat monthly/yearly rental fee.

Allocated Customer Resources ($A_1$ to $A_k$)

These are units of resources, which are not specific to any customer but are allocated dynamically. These resources form part of the shared resource pool. At any point of time, the resources from the shared resource pool which are currently allocated (rented) to a specific customer are designated as the allocated customer resources for that customer. (The units of resources allocated to a customer from the shared resource pool may change from time to time).

Idle Resources Pool (I)

The idle resource pool contains resources left over at any point of time after allocating resources to customers from the shared resource pool.

Customers terminals ($C_1$ to $C_k$): The resource center has multiple customers who may be web site owners as well as businesses which host their content and applications on the infrastructure provided by the resource center. Customers' users (users acting on behalf of the customers, as in case of a business organization, or users being served by customers, as in case of a web site) have client terminals (computers, wireless devices etc.) which are coupled to the resource center through a communication network. The terminals of all the users of a customer i are shown by $C_i$. The customers pay for usage of the resources according to the time duration for which they use a resource at the price rate at which they acquire (obtain on rent) the particular resource.

Figure 2:
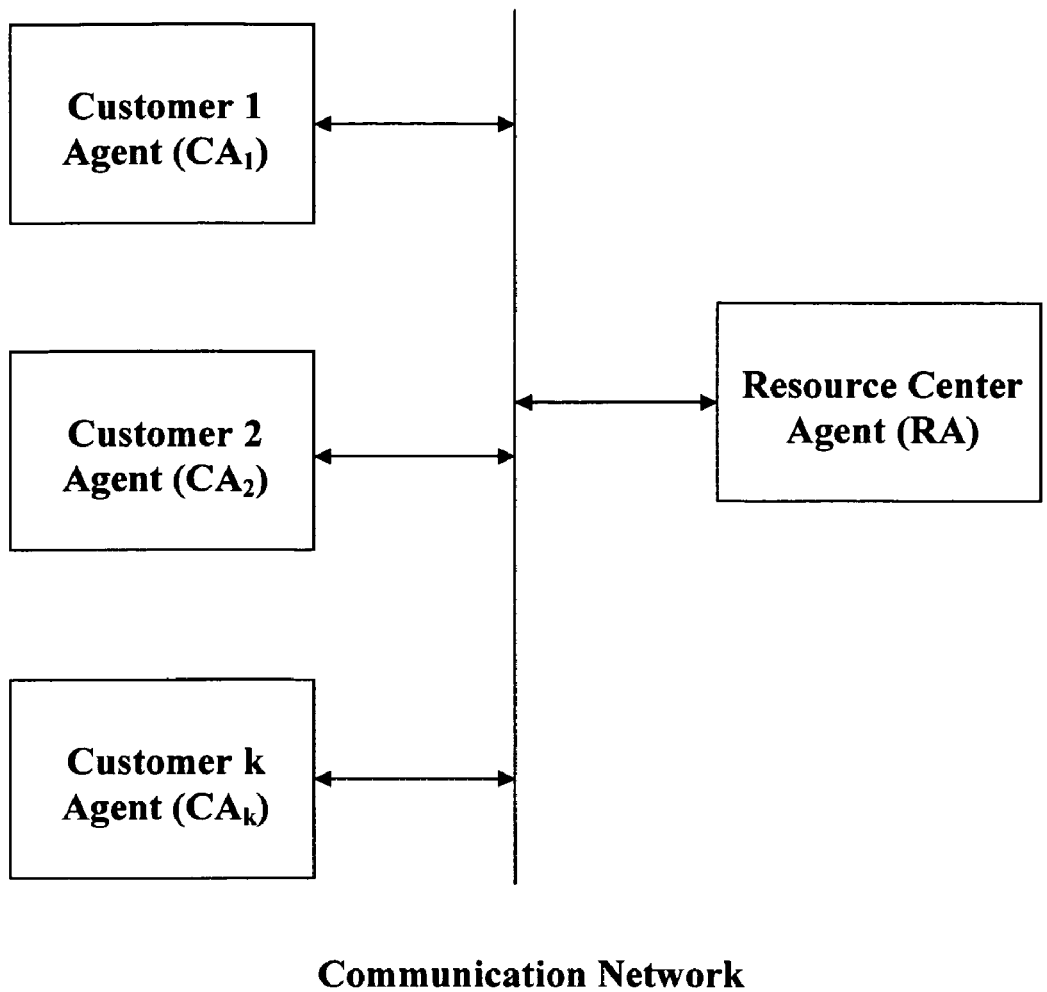
FIG. 2 shows the software agents involved in the negotiation process.

FIG. 2 shows the software agents involved in the process of negotiation for allocation and pricing of the resources. There is a resource center agent (RA), which acts on behalf of the owner of the resource center. It coordinates and facilitates the negotiations for the dynamic allocation and pricing of the resources from the shared resource pool and takes decisions on the allocations and the prices. The resource center agent also keeps track of the units of resources allocated to various customers at any time, the respective time durations of their use and the respective price rates at which the resources were allocated to the customers for the respective time durations. It also computes the charges applicable to each customer and bills them for the resource usage from time to time.

Each customer 1 . . . k also has a software-based customer agent, ($CA_1$ to $CA_k$), which models the customer's behavior and acts on behalf of the customer. The customer's demand curve (i.e., the prices that the customer is willing to pay for incremental units of resources) is either programmed into the agent or is computed dynamically by the agent based on the current level of workload and performance/service levels. The customer agents negotiate with the resource center agent based on this information. The customer agent can reside either in the resource center or in a computer system coupled to the resource center with a communication network.

A customer's requirement for resources varies from time to time with a variation in the workload from its terminals. Also, with a variation in the workload the customer's willingness to pay for different service levels may also change. The present invention provides a method and system whereby software agents of the customers can negotiate with a software agent of the resource center agent for acquiring and releasing resources dynamically at economic prices.

Three preferred embodiments are described below which provide three different methods of negotiations between the customer agents and the resource center agent for dynamically determining the allocations and prices. These embodiments may be operated either individually or in combinations of at least two, depending upon the requirement.

Dynamic Determination 1: Servicing Requests

Under this method of dynamic determination, the customer agents can request the resource center agent for acquiring or releasing resources at any time. The resource center agent tries to serve the requests from the idle resources pool. But if the idle resources pool is empty, it conducts an auction of all the resources in the shared resource pool. The details of how the resource center and customer agents behave under this method are provided below.

(a) Resource Center Agent's Behavior

Figure 3:
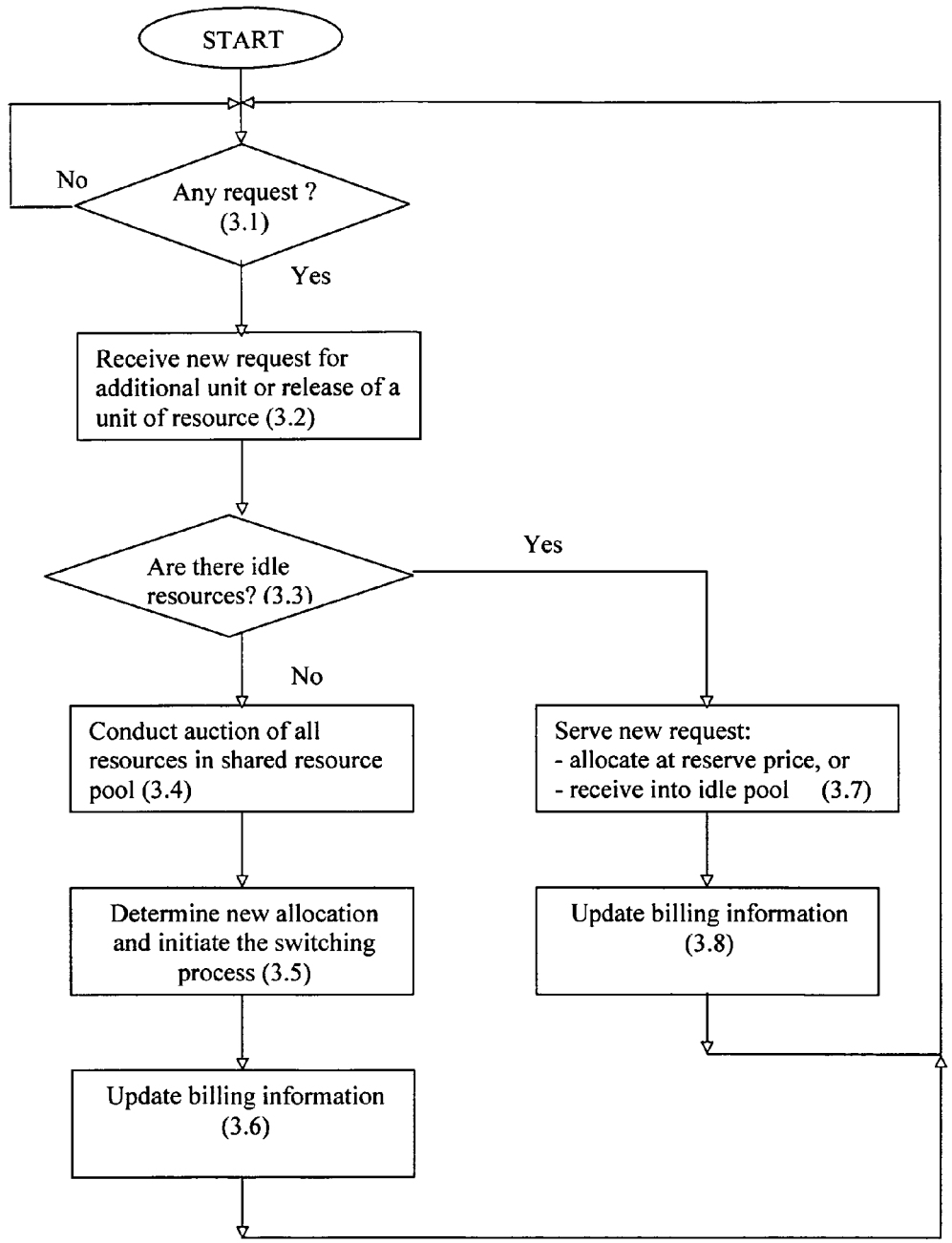
FIG. 3 shows the resource center agent's behavior when customer agents request for allocation or release of a shared resource.

FIG. 3 shows the resource center agent's behavior when it receives a request for allocation or release of a shared resource. The resource center agent continuously checks for requests by customer agents (3.1) either to acquire additional resources or to release resources (3.2). When it encounters such a request, the agent checks if there are any idle resources in the shared resource pool (3.3). If there are idle resources present, then the agent allocates additional resources (at a price designated as the reserve price) or releases resources into the idle resources pool, as requested (3.7). It also updates the billing information pertaining to the usage of the resources just allocated or released (3.8) (with the customer id, price rate and time of allocation or release).

In case there are no idle resources, that is, all the resources in the shared resource pool have already been allocated to customers, then the agent conducts an online auction (3.4) of all the resources in the shared resource pool. As part of the auction process, the resource center agent accepts the bids from customer agents and uses them to determine the new allocation and prices (3.5). The new allocation may involve switching of resources (where a resource may be taken away from one customer and given to another customer). The switching requirements are determined by the resource center agent from the new allocation determined by the auction and the allocation of resources prior to conducting the auction. It then initiates the switching process. Once the switching has been done, the billing information for each unit of resource is updated (3.6) with the new customer id, rate (as determined by the auction), and the time of allocation or release.

At regular intervals, the billing information is used to compute the dues from each customer and this is communicated to the customers.

(b) Customer Agent's Behavior

Figure 4:
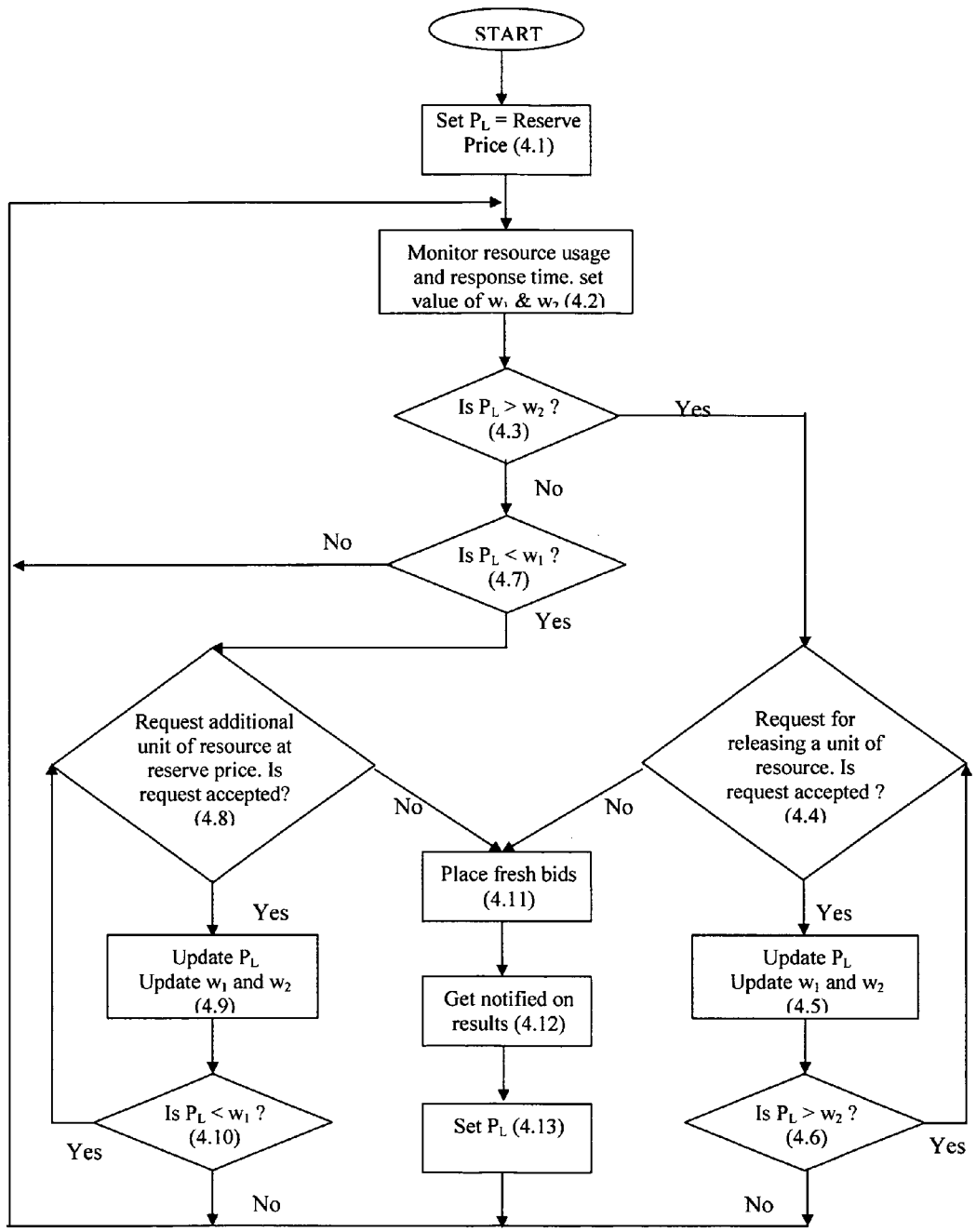
FIG. 4 shows the customer agent's behavior in requesting for the allocation or release of a shared resource.

FIG. 4 shows the behavior of a typical customer agent for allocation or release of a shared resource. Initially, every customer has a set of dedicated resources at its disposal and no customer has a resource from the shared resource pool allocated to it. At a point of time, let $P_L$ denote the price rate for the unit of resource last acquired by the customer from the shared resource pool and not yet released back. Initially, $P_L$ is set to the reserve price (4.1).

The customer agent continuously monitors the resource usage, the current workload and the response/turnaround time (response/turnaround time for a job is the length of the time interval starting from the time when the job was submitted upto the time when the job is completed) (4.2). Based on them, the agent determines the customer's current willingness to pay (denoted by $w_1$) for an additional unit of the resource. This may be based on the benefit expected from an improvement in turnaround time achieved due to the additional resource. The customer's agent also computes $w_2$, which denotes a value such that if the price of the unit of resource last acquired by the customer is greater than the current $w_2$, then the customer agent would release that unit of resource back to the resource center. Note that by definition, $w_2 > w_1$. (To put simply, a customer acquires an additional unit of resource if the price is below $w_1$, holds it for prices between $w_1$ and $w_2$, but releases it back if the price is above $w_2$). The values $w_1$ and $w_2$ depend on the current response time (or service level) being experienced by the customer and the customer's willingness to pay for obtaining various service levels. They can be low if the response time is very good and could be high if the response time is poor, reflecting increased desperation of the customer to get additional resources).

Once the customer agent has computed the values of $w_1$ and $w_2$, it determines whether $P_L$ is greater than $w_2$ (4.3). (This implies checking if the price rate being paid for the unit of resource last acquired by the customer, which also happens to be the cheapest unit of resource being held by the customer, is greater than the current willingness to pay for it). If so, then the customer agent proceeds to request the resource center agent for releasing a unit of the resource (4.4). If the resource center agent accepts its request, it then proceeds to update the value of $P_L$ (4.5). As per the definitions of $P_L$, $P_L$ is now set to the price rate at which the unit of resource last acquired by the customer and not yet released back. Similarly the customer agent recomputes $w_1$ and $w_2$ (4.5) after taking into account the effect of release of one unit of resource. The customer agent again checks whether the new $P_L$ exceeds the current willingness to pay for the last unit, namely $w_2$ (4.6). If this is true, the customer agent again requests for releasing another unit of resource and the cycle is repeated. Otherwise, the agent goes back to the step of continuously monitoring workload, resource usage and response time (4.2).

If the resource center agent does not accept the customer agent's request for releasing a unit of resource at 4.4 (which would happen if there were to be no idle resources in the resource center), then a fresh auction for all the resources in the shared resource pool takes place, for which the customer agent places a set of fresh bids (4.11). Each bid is for a single unit of resource and contains the price, which the customer is willing to pay for that unit of the resource. A customer agent places multiple such bids corresponding to the number of units of resources it wishes to acquire at different prices. The resource center agent collects bids from all customer agents similarly and then decides the new allocation and prices. The customer agent gets notified of the auction results (4.12), and in particular the number of units of resources allocated to it and the corresponding prices. It now updates $P_L$ (4.13) and goes back to the step of continuously monitoring workload, resource usage and response time (4.2).

If it initially happened that $P_L$ was not greater than $w_2$ (4.3), then the customer agent checks whether the price being paid for the last acquired resource, $P_L$, has fallen below the current willingness to pay for an additional resource, namely $w_1$ (4.7). If so, then the customer agent proceeds to request the resource center agent for acquiring an additional unit of the resource (4.8). If the resource center agent accepts its request, it then proceeds to update the value of $P_L$ (4.9). As per the definitions of $P_L$, $P_L$ is now set to the price rate for unit of resource just acquired which also happens to equal the reserve price. Similarly the customer agent recomputes $w_1$ and $w_2$ after taking into account the effect of the acquisition of one unit of resource. The customer agent again checks whether the new $P_L$ is still below the current wilingness to pay for an additional unit, namely $w_1$ (4.10). If this is true, the customer agent again requests for acquiring another unit of the resource and the cycle is repeated. Otherwise, the agent goes back to the step of continuously monitoring workload, resource usage and response time (4.2).

If the resource center agent does not accept the customer agent's request for acquiring an additional unit of resource (4.8) (which would happen if there were to be no idle resources in the resource center), then a fresh auction for all the resources in the shared resource pool takes place, for which the customer agent places a set of fresh bids (4.11). Each bid is for a single unit of resource and contains the price which the customer is willing to pay for that unit of the resource. A customer agent places multiple such bids corresponding to the number of units of resources it wishes to acquire at different prices. The resource center agent collects bids from all customer agents similarly and then decides the new allocation and prices. The customer agent gets notified of the auction results (4.12), and in particular the number of units of resources allocated to it and the corresponding prices. It now updates $P_L$ (4.13) and goes back to the step of continuously monitoring workload, resource usage and response time (4.2).

Dynamic Determination 2: Batched Auctions

Under this method of dynamic determination, the resource center agent conducts an auction of all the resources in the shared resource pool at regular intervals to determine the allocations and prices of the resources for the next time interval. The details of how the resource center and customer agents behave under this method are provided below.

(a) Resource Center Agent's Behavior

Figure 5:
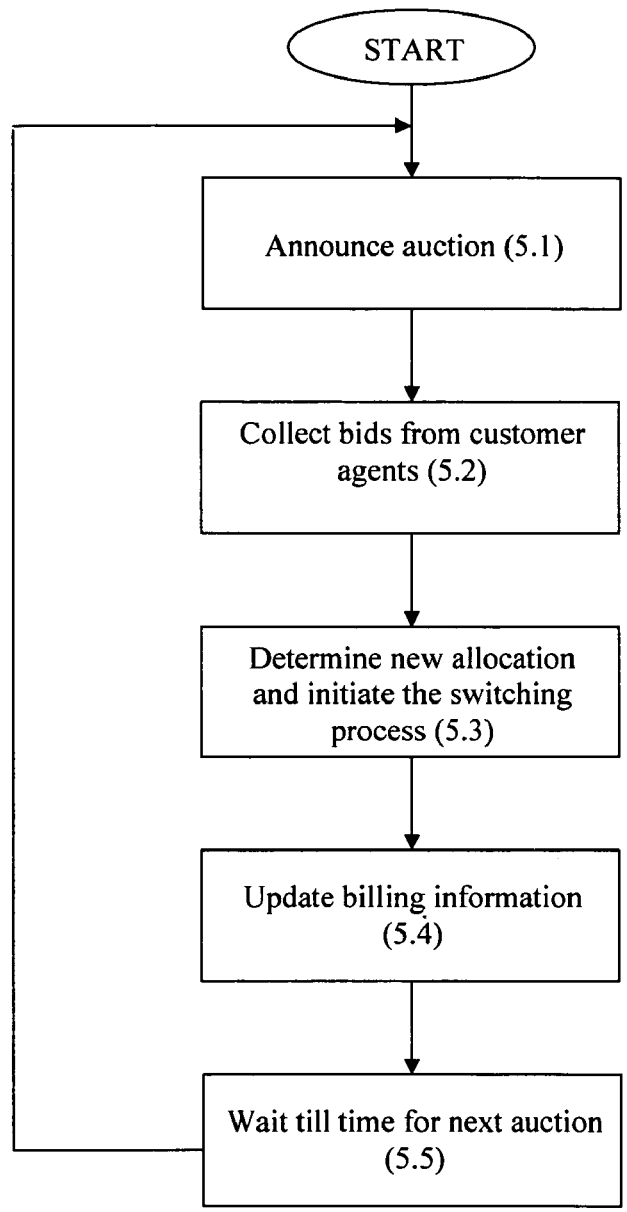
FIG. 5 shows the resource center agent's behavior for conducting batched auctions.

FIG. 5 shows the behaviour of the resource center agent for the case of batched auctions, where an auction announced at the end of predetermined time intervals (5.1) (no requests are entertained in the time interval between two successive auctions) for resources in the shared resource pool. On announcement of an auction, the resource center agent waits for bids and collects bids from all the customer agents (5.2). It then determines the new allocation and prices based on the bids received and initiates the process of switching resources from the old allottees to the new allottees as may be required (5.3). The information for each unit of resource, containing the new price, the usage start time and the allottee identification data are recorded for billing purposes (5.4). The resource center agent then waits for the time for the next auction (5.5) when the entire process is repeated.

At regular intervals, the billing information is used to compute the dues from each customer and this is communicated to the customers.

(a) Customer Agent's Behavior

Figure 6:
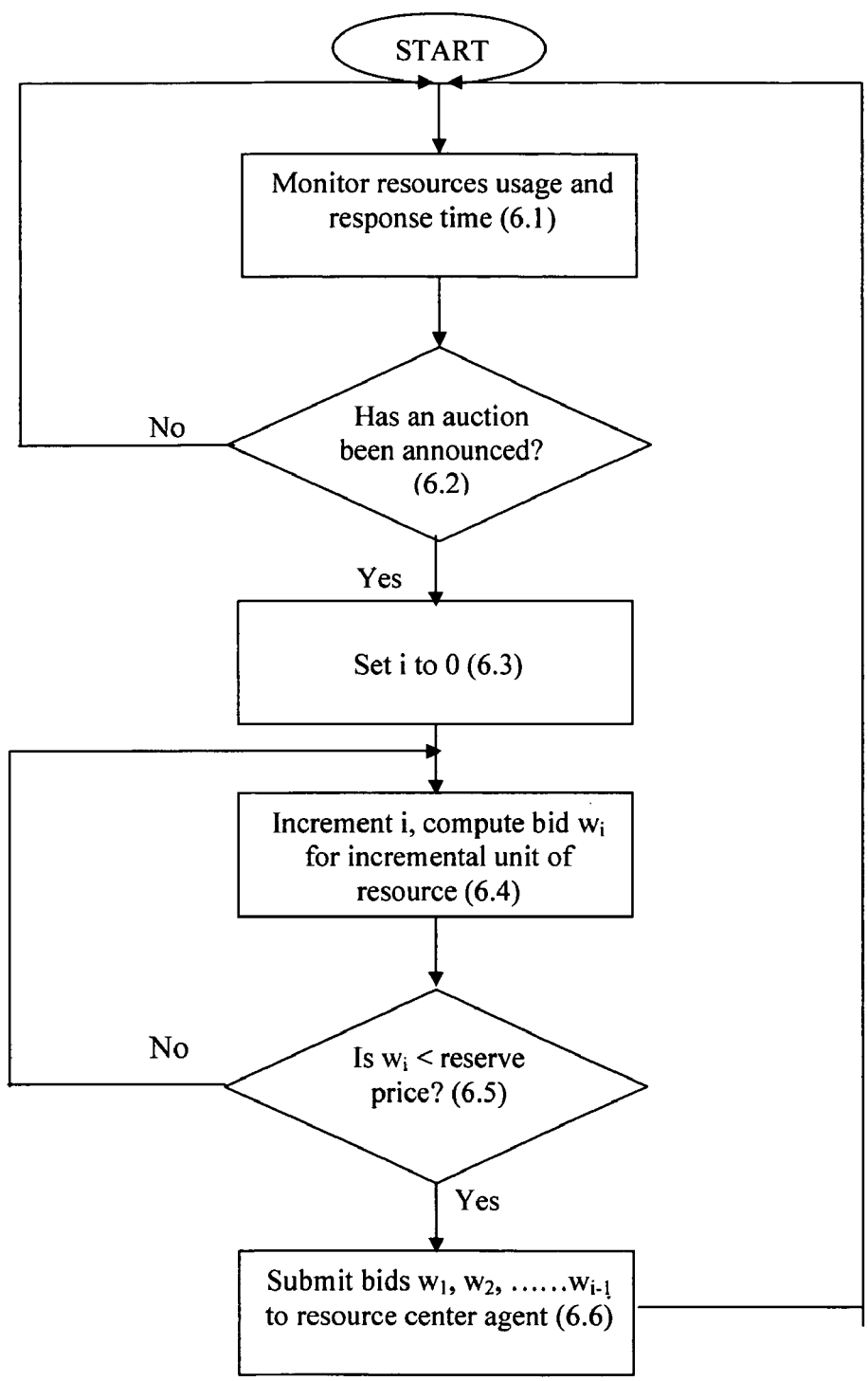
FIG. 6 shows the customer agent's behavior in response to a batched auctions

FIG. 6 shows a typical customer agent behaviour when batched auctions are used for negotiations. The customer agent continuously monitors the resource usage, the current workload and the response/turnaround time (6.1). When an auction is announced (6.2), the agent computes the bids it should place in the following manner: Each bid is for a single unit of resource and contains the price rate, which the customer is willing to pay for that unit of the resource. The agent initially sets a counter i to zero (6.3). The counter keeps track of the number of bids to be placed by the agent. The agent then increments i by one and computes the price $w_i$ that it is willing to pay for acquiring the i-th unit of resource based on its estimates of the current workload and performance/service levels (6.4). If the price $w_i$ is not less than the reserve price for the auction (6.5), the agent temporarily remembers this bid value $w_i$ and then goes ahead to calculate the value of the next potential bid by incrementing i again by one and so on (6.4). If for some i, it happens that the potential bid value $w_i$ is less than the reserve price for the auction, then this would constitute an invalid bid. The customer agent now submits all the i-1 bids computed by it until the last bid $w_i$ (i.e., the bids $w_1$, $w_2, \ldots, w_{i-1}$) (6.6). The resource center agent collects bids from all customer agents similarly and then decides on the new allocation and prices. The customer agent goes back to the step of continuously monitoring workload, resource usage and response time (6.1).

Dynamic Determination 3: Publishing Prices

Under this method of dynamic determination, the resource center publishes the prices at which resources of the shared resource pool can be acquired or released by the customer agents and the customer agents use these prices for determining whether to request for releasing or acquiring resources. The details of how the resource center and customer agents behave under this method are provided below.

(a) Resource Center Agent's Behavior

Figure 7:
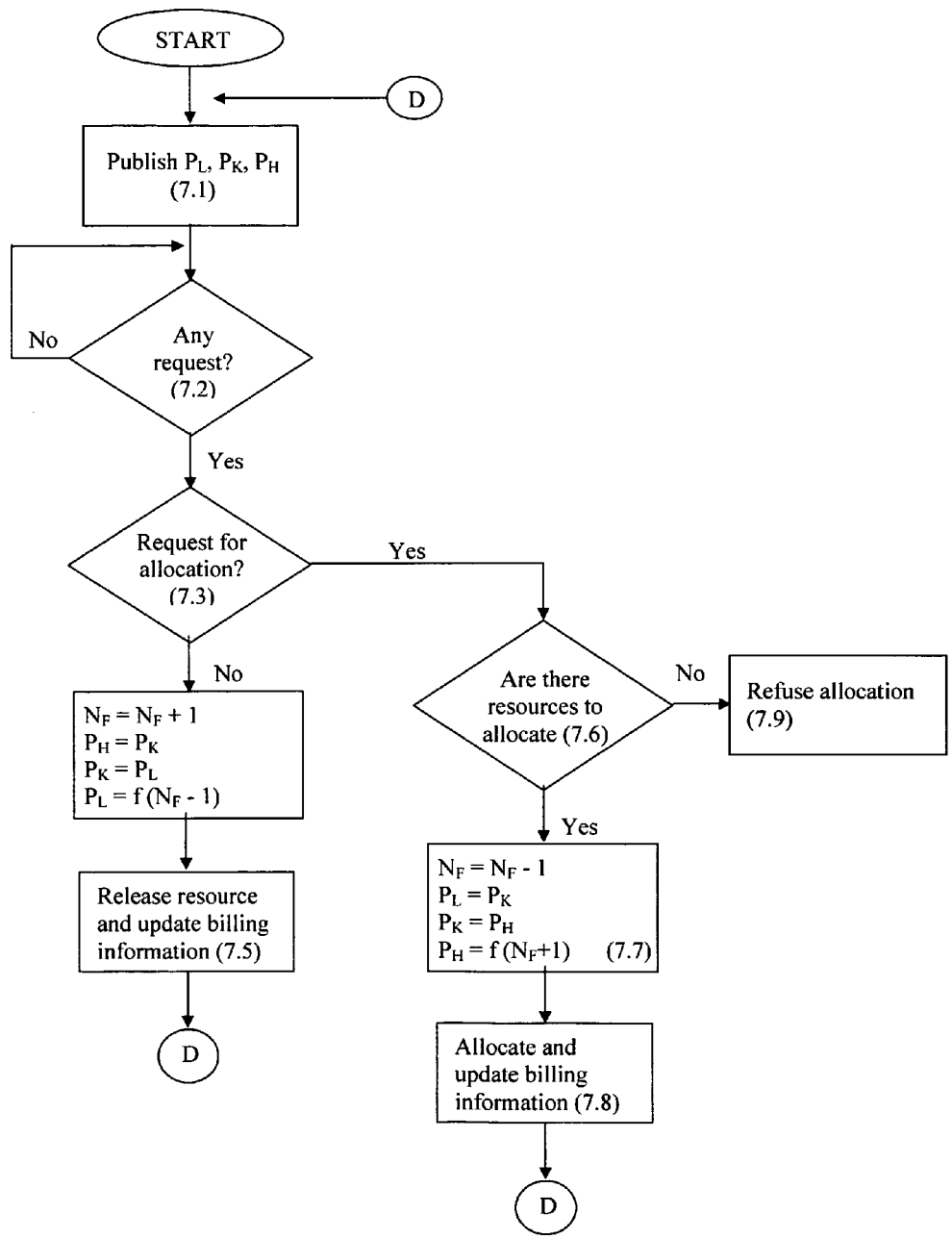
FIG. 7 shows the resource center agent's behavior for publishing prices for shared resources.

FIG. 7 shows the behaviour of the resource center agent for publishing prices for the shared resources. The resource center agent publishes three prices (7.1):

1. $P_K$—the current price at which the resources from the shared resource pool have been allocated to all customers
2. $P_L$—the new price of the allocated resources if one unit of the resource is released by any customer. This is the price that all customers will have to start paying for each unit of the resource from the shared resource pool still allocated to them, regardless of who made the release request, from the point of time that such release is effected.
3. $P_H$—the new price of the resources allocated from the shared resource pool if an additional unit of the resource is allocated to any customer from the idle pool. The price rate applies to all customers and not just to the customer making the request, from the point of time when such a new allocation is effected.

The price $P_K$ is computed by applying a numeric function $f$ on the number of units of resources which in the idle resource pool (denoted by $N_f$). The function $f$ would have the property that as the number of idle resources decreases, the price increases. Let $P_K$ be denoted by $f(N_f)$. Then $P_L = f(M_f - 1)$ and $P_H = f(N_f + 1)$.

The resource center agent waits for any requests from the customer agents. On receiving a request (7.2), It determines if the request is for allocation of an additional unit of the resource (7.3), and if so, it checks if there are idle resources in the shared resources pool (7.6). The absence of idle resources would prompt the resource center agent to reject the request (7.9). Otherwise, it decrements the value of $N_f$ by one and updates the prices as follows (7.7): The price $P_L$ is assigned the value of the old price $P_K$, the price $P_K$ is assigned the value of the old price $P_H$ and the price $P_H$ is computed afresh as the function of $N_f + 1$. The agent then allocates a fresh unit of resource to the customer whose agent made the request (7.8). It also updates the billing information pertaining to the usage of the unit of resource just allocated (with the customer id and time of allocation) and also logs the new price $P_K$ and the time when it was set (current time). It then goes back to the original step of publishing the prices $P_L$, $P_K$ and $P_H$ (7.1).

On the other hand, if the request is not for allocation of an additional unit, it must be for the release of a unit of resource (7.3). In this case, the resource center agent increments the value of $N_f$ by one and updates the prices as follows (7.4): The price $P_H$ is assigned the value of the old price $P_K$, the price $P_K$ is assigned the value of the old price $P_L$ and the price $P_L$ is computed afresh as the function of $N_f - 1$. The agent then releases a unit of resource to the customer whose agent made the request (7.5). It also updates the billing information pertaining to the usage of the unit of resource just released (with the customer id and time of release) and also logs the current price $P_K$ and the time when it was set (current time). It then goes back to the original step of publishing the prices $P_L$, $P_K$ and $P_H$ (7.1).

(a) Customer Agent's Behavior

Figure 8:
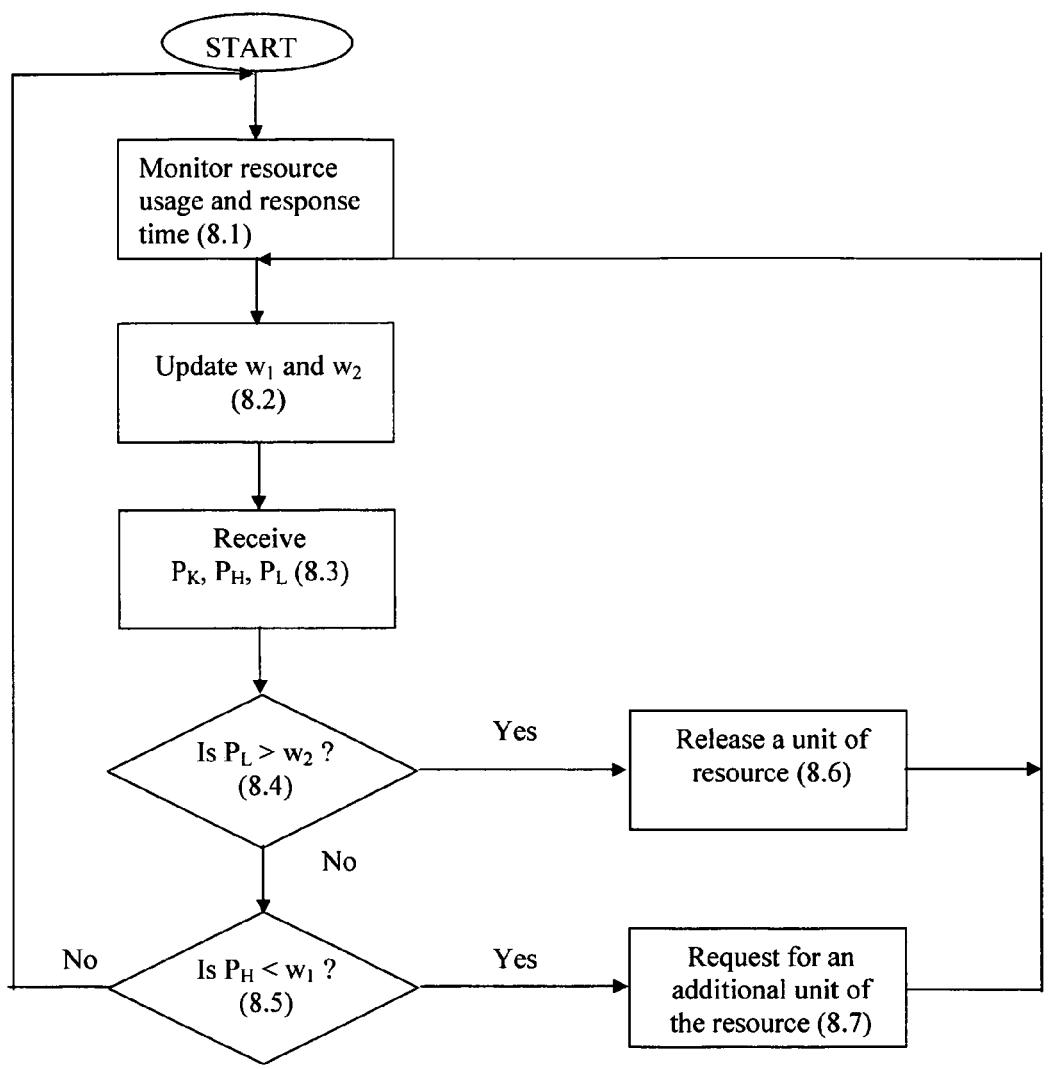
FIG. 8 shows the customer agent's behavior in response to publishing of prices for shared resources.

FIG. 8 shows the behaviour of customer agent when the negotiations take place through publishing of prices by the resource center. The customer agent's primary job is continuously determine the customer's willingness to pay and then based on the prices announced by the resource center agent, decide whether to request for releasing or requesting a unit of resource or do nothing.

The customer agent monitors the current workload, resource usage and turnaround time (8.1) and computes the price ($w_1$) below which it would acquire an additional resource and the price ($w_2$) above which it would release a unit of the resource (8.2). It then receives the information on the current prices ($P_K$, $P_H$ and $P_L$) from the resource center agent (8.3). It now checks whether it should release a unit of resource by checking if $P_L > w_2$ (8.4). If so, it makes a request to the resource center agent for releasing a unit of resource (8.6). It then goes on to recompute the values of $w_1$ and $w_2$ incorporating the expected effect of the release of the last unit and so on (8.2).

If on the other hand, the condition for releasing a unit of resource is not met, the agent then checks whether it should acquire an additional unit of resource by checking if $P_H < w_1$ (8.5). If so, it makes a request to the resource center agent for an additional unit of resource (8.7). It then goes on to recompute the values of $w_1$ and $w_2$ incorporating the expected effect of the acquisition of the last unit and so on (8.2). Otherwise, it goes into the step of monitoring the resource usage, current workload and the turnaround time (8.1).

We claim:

1. A computer implementable system for allocation and pricing of classified resources of a web server farm to customers by a resource center, wherein said allocating of said resources comprises transferring, by said resource center, said resources from one customer to another customer, said system comprising:

means for providing different levels of service by dynamically allocating and pricing said resources based on customers' changing needs, and their willingness to pay for different service levels, wherein said dynamically allocating and pricing resources is accomplished through mutual on-line negotiations between said customers and said resource center through electronic communications, wherein said mutual online negotiations takes place between software-based agents representing said customers and said resource center, and wherein each class of resources has some units dedicated to specific customers with remaining units being dynamically allocated to customers by the resource center;

means for enabling the customers to provide price and service level related inputs to their respective software-based agents; and means for said software-based agents representing customers to monitor the usage of resources allocated to them and the levels of service being obtained, wherein said allocation occurs using a dynamic negotiation between said customers and said resource center, wherein said dynamic negotiation comprises any of said customers requesting said resource center to acquire and release resources at any time; said resource center conducting an auction of all available resources in a shared resource pool at predetermined intervals to determine said allocation and pricing of said resources for a subsequent time interval; and said resource center publishing said prices at which said resources of said shared resource pool can be acquired or released by said customers, whereby said customers use said prices for determining whether to request releasing or acquiring said resources.

2. The system as claimed in claim 1, further comprising:

a mechanism for conducting an online auction of said resources by the resource center in case of non-availability of adequate idle resources to meet a customer request followed by re-allocation of said resources to said customers, updating of billing information and pricing based on the results of the auction of resources;

a mechanism for conducting an online auction of resources at pre-specified intervals of time followed by re-allocation of said resources to said customers, updating of billing information and pricing based on results of the auction of resources; and a mechanism for publishing the current prices for each class of resources at any point of time and means for updating the current prices dynamically based on requests for release or acquisition of resources by customers, followed by updating of billing information, the arrangement being such that said mechanisms operate either individually or together in any combination of at least two mechanisms depending upon the requirement.

3. The system as claimed in claim 2, wherein said current prices comprise the current price at which resources are allocated to customers, the new price that would prevail if specified units of resources are released by customers and the new price that would prevail if specified units of resources are acquired by the customers.

4. The system as claimed in claim 1, further including
means for said software-based agents representing customers to use said inputs from said customers and said usage and/or said levels of service being obtained to dynamically determine when to request the software agent representing the resource center for acquiring or releasing resources at various prices.

5. The system as claimed in claim 1, wherein said resources in a resource center includes servers, storage media, software applications and bandwidth of communication link connecting said servers center to a network.

6. A method for allocating and pricing classified resources of a web server farm to customers by a resource center, wherein said allocating of said resources comprises transferring, by said resource center, said resources from one customer to another customer, said method comprising:
providing different levels of service by dynamically allocating and pricing said resources based on said customer's changing needs, and their willingness to pay for different service levels, wherein said dynamically allocating and pricing resources is accomplished through mutual on-line negotiations between said customers and said resource center through electronic communications, wherein said mutual online negotiations takes place between software-based agents representing said customers and said resource center, and wherein each class of resources has some units dedicated to specific customers with remaining units being dynamically allocated to customers by the resource center;
enabling the customers to provide price and service level related inputs to their respective software-based agents; and
enabling said software-based agents representing customers to monitor the usage of resources allocated to them and the levels of service being obtained, wherein said allocating occurs using a dynamic negotiation between said customers and said resource center, wherein said dynamic negotiation comprises any of said customers requesting said resource center to acquire and release resources at any time; said resource center conducting an auction of all available resources in a shared resource pool at predetermined intervals to determine said allocation and pricing of said resources for a subsequent time interval; and said resource center publishing said prices at which said resources of said shared resource pool can be acquired or released by said customers, whereby said customers use said prices for determining whether to request releasing or acquiring said resources.

7. The method as claimed in claim 6, further comprising
conducting an online auction of said resources by the resource center in case of non-availability of adequate idle resources to meet a customer request followed by re-allocation of said resources to said customers, updating of billing information and pricing based on the results of the auction of resources,
conducting an online auction of resources at pre-specified intervals of time followed by re-allocation of said resources to said customers, updating of billing in information and pricing based on results of the auction of resources, and
publishing the current prices for each class of resources at any point of time and means for updating the current prices dynamically based on requests for release or acquisition or resources by customers, followed by updating of billing information,
the arrangement being such that said steps operate either individually or together in any combination of at least two steps depending upon the requirement.

8. The method as claimed in claim 7, wherein said current prices comprise the current price at which resources are allocated to customers, the new price that would prevail if specified units of resources are released by customers and the new price that would prevail if specified units of resources are acquired by the customers.

9. The method as claimed in claim 6, further including
enabling said software-based agents representing customers to use said inputs from said customers and said usage and/or said levels of service being obtained to dynamically determine when to request the software agent representing the resource center for acquiring or releasing resources at various prices.

10. The method as claimed in claim 6, wherein said resources in a resource center includes servers, storage media, software applications and bandwidth of communication link connecting said servers center to a network.

11. A computer program product comprising computer readable program code stored on computer readable storage medium embodied therein for enabling allocation and pricing of classified resources of a web server farm to customers by a resource center, wherein said allocating of said resources comprises transferring, by said resource center, said resources from one customer to another customer, said computer program product comprising:
computer readable program code configured for providing different levels of service by dynamically allocating and pricing said resources based on customers' changing needs, and their willingness to pay for different service levels, wherein said dynamically allocating and pricing resources is accomplished through mutual on-line negotiations between said customers and said resource center through electronic communications, wherein said mutual online negotiations takes place between software-based agents representing said customers and said resource center, and wherein each class of resources has some units dedicated to specific customers with remaining units being dynamically allocated to customers by the resource center;
computer readable program code configured for enabling the customers to provide price and service level related inputs to their respective software-based agents; and
computer readable program code configured for enabling said software-based agents representing customers to monitor the usage of resources allocated to them and the levels of service being obtained, wherein said allocation occurs using a dynamic negotiation between said customers and said resource center, wherein said dynamic negotiation comprises any of said customers requesting said resource center to acquire and release resources at any time; said resource center conducting an auction of all available resources in a shared resource pool at predetermined intervals to determine said allocation and pricing or said resources for a subsequent time interval; and said resource center publishing said prices at which said resources of said shared resource pool can be acquired or released by said customers, whereby said customers use said prices for determining whether to request releasing or acquiring said resources.

12. The computer program product as claimed in claim 11, further comprising:

computer readable program code configured for conducting an online auction of said resources by the resource center in case of non-availability of adequate idle resources to meet a customer request followed by re-allocation of said resources to said customers, updating of billing information and pricing based on the results of the auction of resources;

computer readable program code configured for conducting an online auction of resources at pre-specified intervals of time followed by re-allocation of said resources to said customers, updating of billing information and pricing based on results of the auction of resources; and computer readable program code configured for publishing the current prices for each class of resources at any point of time and means for updating the current prices dynamically based on requests for release or acquisition or resources by customers, followed by updating of billing information, the arrangement being such that said computer readable program code means operate either individually or together in any combination of at least two computer readable program codes depending upon the requirement.

13. The computer program product as claimed in claim 12, wherein said current prices comprise the current price at which resources are allocated to customers, the new price that would prevail if specified units of resources are released by customers and the new price that would prevail if specified units of resources are acquired by the customers.

14. The computer program product as claimed in claim 11, further including computer readable program code configured for said software-based agents representing customers to use said inputs from said customers and said usage and/or said levels of service being obtained to dynamically determine when to request the software agent representing the resource center for acquiring or releasing resources at various prices.

15. The computer program product as claimed in claim 11, wherein said resources in a resource center includes servers, storage media, software applications and bandwidth of communication link connecting said servers center to a network.

* * * * *